(12) United States Patent
Gerding et al.

(10) Patent No.: US 7,773,544 B2
(45) Date of Patent: Aug. 10, 2010

(54) CALL JUMP SYSTEM, METHOD AND APPARATUS

(75) Inventors: Rolf-Dieter Gerding, Bonn (DE);
Hermann Granzer, Pöcking (DE);
Ruediger Hnyk, Friedberg (DE);
Holger Wiedorn, Niederkassel (DE)

(73) Assignee: Deutsche Telekom AG, Bonn ( * ) Notice: Subject to any disclaimer, the term of this patent is extended or adjusted under 35 U.S.C. 154(b) by 792 days.

(21) Appl. No.: 10/574,335

(22) PCT Filed: Sep. 28, 2004

(86) PCT No.: PCT/EP2004/052339
§ 371 (c)(1),
(2), (4) Date: Apr. 9, 2007

(87) PCT Pub. No.: WO2005/032081
PCT Pub. Date: Apr. 7, 2005

(65) Prior Publication Data
US 2008/0037513 A1 Feb. 14, 2008

(30) Foreign Application Priority Data
Sep. 30, 2003 (EP) ................... 03022177

(51) Int. Cl.
*H04L 12/16* (2006.01)
(52) U.S. Cl. .................. 370/260; 370/259; 370/352; 348/14.08

(58) Field of Classification Search ............... 348/14.08
See application file for complete search history.

(56) References Cited

U.S. PATENT DOCUMENTS

| 6,215,515 | B1 * | 4/2001 | Voois et al. ............. 348/14.01 |
| 7,489,671 | B2 * | 2/2009 | Marsico et al. ............. 370/338 |
| 2002/0136231 | A1 | 9/2002 | Leatherbury et al. |
| 2003/0065805 | A1 | 4/2003 | Barnes, Jr. |
| 2004/0233900 | A1 * | 11/2004 | Andersen et al. ............ 370/352 |

FOREIGN PATENT DOCUMENTS

| JP | 57159153 | 10/1982 |
| JP | 05304541 | 11/1993 |
| JP | 2003264479 | 9/2003 |
| WO | WO 01/74024 A2 | 10/2001 |

* cited by examiner

*Primary Examiner*—Duc C Ho
(74) *Attorney, Agent, or Firm*—Leydig, Voit & Mayer, Ltd.

(57) ABSTRACT

A call jump establishes a jump from a call of a traditional telephone carrier established with audio signals. When it is determined that video should be added to the call, a packetized network is connected. The audio and video are transmitted over the packetized network. There is provided standard telephone equipment. A video enabled device is capable of rerouting the audio selectively to either the traditional telephone carrier or the packetized network. A packetizer packetizes the audio signals from the standard telephone equipment and the video.

17 Claims, 5 Drawing Sheets

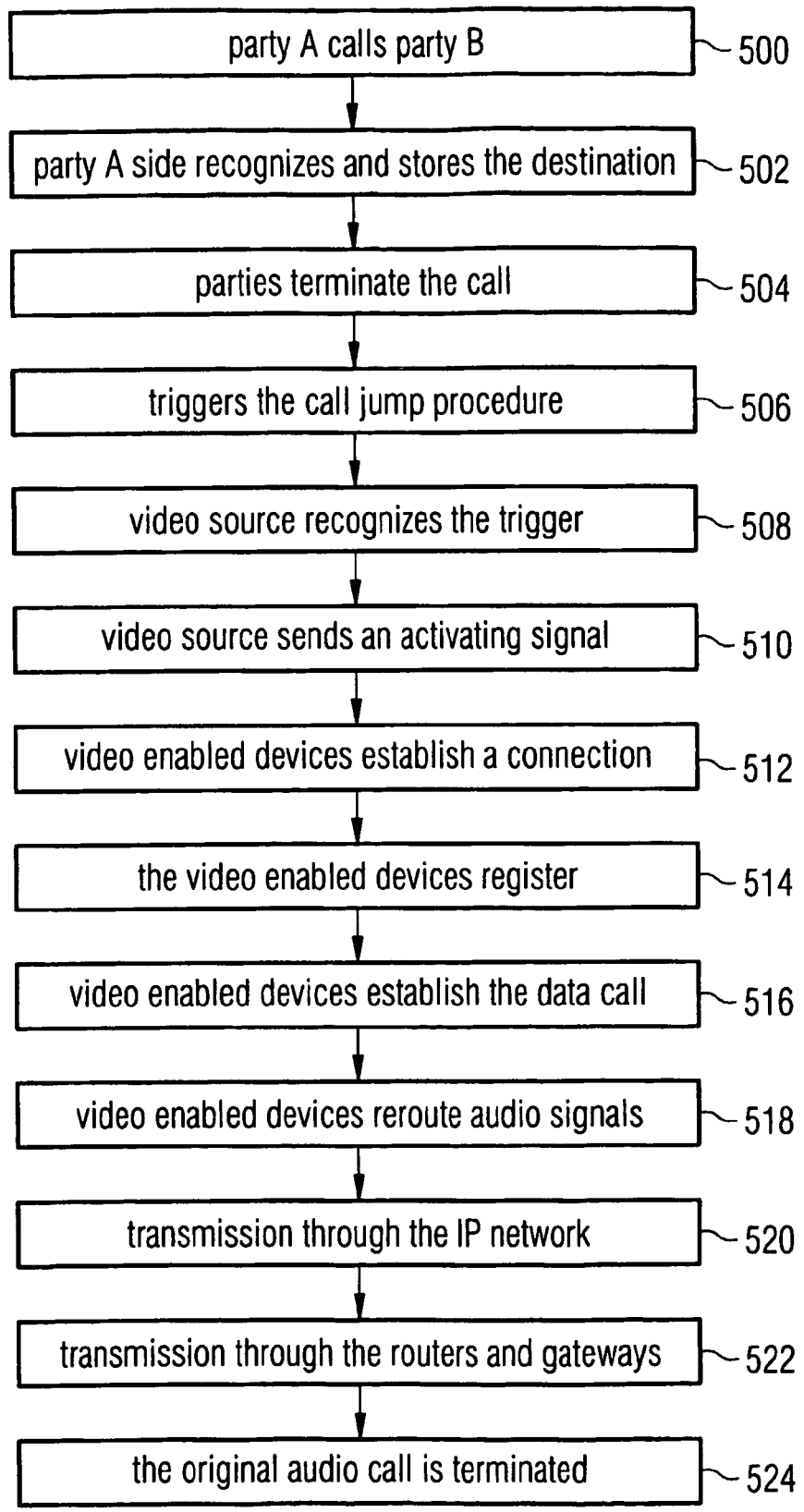

CALL JUMP SYSTEM, METHOD AND APPARATUS

CROSS REFERENCE TO RELATED APPLICATIONS

This application is the U.S. National Stage of International Application No. PCT/EP2004/052339, filed Sep. 28, 2004 and claims the benefit thereof. The International Application claims the benefits of European application No. 03022177.4 EP filed Sep. 30, 2003, , both of the applications are incorporated by reference herein in their entirety.

FIELD OF INVENTION

The invention relates to a call jump and, more particularly, to a call jump system, method and apparatus for jumping an audio call to an audio/video (AV) network, particularly an Internet Protocol Network.

BACKGROUND OF INVENTION

In the field of packet oriented communication devices, what is lacking is the convenience for end users. Unlike in traditional telephone communication where the user simply lifts a hand receiver, packet oriented communication offers a variety of devices with which to access the packet network and to communicate with other users. Problematically, this is inconvenient for the end user, who must decide which communication form to use when initiating a call.

SUMMARY OF INVENTION

These days, for example, more people are accessing email and instant messaging through personal computer (PC) based devices. Through PCs, the demand for extended video services, such as video conferencing has also increased. However, and while there is a growing need for these types of communications, the biggest objection is that they require the use of the PC. In addition to the expense, the PC is normally not at hand, and typically not booted up, to be of any use. Not to mention that the PC must be installed with a specific video communication application and special hardware.

To resolve the problems presented by the PC, there have been proposed devices, such as the so-called videophone, that allows a user to establish a video conference call that supports both audio and video information. It has been proposed that a set top box could provide this capability. However, the previous solutions are still not very convenient from a users point of view. Video conferencing requires the use of a special video capable device. Thus, the users are required to establish the phone call using the video conferencing device.

It has been proposed, for example, to use a video conference phone. It has also been proposed to employ a Set Top Box for this purpose, an electronic device that is connected to a communication channel, such as a phone, Integrated Services Digital Network (ISDN) or cable television line, and produces output on a conventional television screen. Set-top boxes are commonly used to receive and decode digital television broadcasts and to interface with the Internet through the user's television instead of a PC.

However, it is still inconvenient to the user as he must break his normal routine of using standard telecommunications equipment. For each call, the user has to decide if he wants to use his normal telephone or the video phone. This is a great hurdle for the video phone industry to overcome as well as a real inconvenience to the users.

It is also impractical for the business environment to install a video conference phone at every work station. The set top box, as well, is practical only for home users. In the business context, it is not likely that the employer will provide a set top box, which is normally employed for watching television transmissions.

Further, it is typical that conference calls are conducted on the spur of the moment. This is simply impractical in the office setting. For another thing, the situation often arises that parties are in the midst of a normal telephone call, such as via Public Switched Telephone Network (PSTN), and it is decided to initiate a vide conference. In this situation, it was heretofore not possible to then add video information.

The typical situation is that two parties are already connected through a normal PSTN. The question arises how the parties can add video during the PSTN call. It is also not clear how the previous systems would extend their capability to other forms of video information, such as Voice over Internet Protocol (VoIP), as well as other media types. The question further arises how the parties are able to implement a seamless transition from the PSTN to an environment that supports the video information.

Burkman et al. (U.S. Pat. No. 5,920,693) filed Sep. 30, 1997, describe an audio to video switchover in video conferencing. However, Burkman et al. do not describe how to jump from a standard telephone network to an Internet Protocol (IP) network. Nor do they describe a means for handshaking between the standard telephone network and the IP network. Burkman et al. teach only switching from an audio channel of an Integrated Services Digital Network (ISDN) to a video channel of the ISDN (Col. 4, lines 4-14). For this reason, Burkman et al. nowhere teach a handshaking means for switching between the standard telephone network and the IP network. The Burkman et al. solution is thus limited to the ISDN domain and is not able to, therefore, provide the same services as an IP network, such as VoIP and other media types.

Another difficulty is that of dividing the bandwidth between audio and video information over an IP channel. When audio suddenly has to share bandwidth with video information, it becomes difficult to determine the optimum amount of bandwidth to allocate to each. The difficulty presented over an IP line is particularly troublesome. With a packetized network such as the IP, a significant portion of the bandwidth is dedicated to headers and information describing the identity of the packet and its source and destination.

Heretofore, there is no means by which a PSTN call can seamlessly implement video information in a convenient manner. The systems of heretofore do not allow users to communicate using their known devices, particularly the PSTN telephone, nor do they offer a means to add video capabilities to the already established call. What is more, at least one of the previous methods does not provide handshaking between the standard network and the IP network.

What is needed, therefore, is to allow users to communicate using their known devices, particularly the PSTN telephone, and offer additionally a convenient manner to add video capability. What is needed is a device that provides the convenience equipment that the user is accustomed to a such as those found in the common living room. This should be done without inconveniencing the user with a special video conferencing phone. The goal is to seamlessly transition a call to implement the exchange of video information. What is needed is a mechanism of the present invention for enabling easy-to-use standard communication equipment which connect through the traditional telephone network that establishes the video communication over an IP connection.

An objective of the present invention is to allow users to communicate using their known devices.

An objective of the present invention is to allow users to communicate using the PSTN telephone.

An objective of the present invention is to offer a convenient manner to add video capability.

An objective of the present invention is to provide convenient equipment that the user is accustomed to.

An objective of the present invention is to provide video conferencing using T.V.

An objective of the present invention is to not inconvenience the user with a special video conferencing phone.

An objective of the present invention is to seamlessly transition a call to implement the exchange of video information.

An objective of the present invention is to provide a protocol of for enabling easy-to-use standard communication equipment.

An objective of the present invention is to connect through the traditional telephone network that establishes the video communication over an IP connection.

In accordance with these and other objectives, there is provided a method for performing a call jump from a call established using a traditional telephone carrier to a video carrying call. A traditional telephone call is established with audio signals. It is determined that video should be added to the call. A packetized network is connected to. The audio and video are transmitted over the packetized network.

In another aspect of the invention, a call jump system is provided for jumping a call established over a traditional telephone carrier to a packetized network. There is provided standard telephone equipment. A video enabled device is capable of rerouting the audio selectively to either the traditional telephone carrier or the packetized network. A packetizer packetizes the audio signals from the standard telephone equipment and the video.

BRIEF DESCRIPTION OF THE DRAWINGS

The invention shall be described with reference to the following figures which are merely examples of the embodiments of the invention.

FIG. 5 is a flow diagram of the process flow for the protocol of the present invention.

DETAILED DESCRIPTION OF INVENTION

Figure 1:
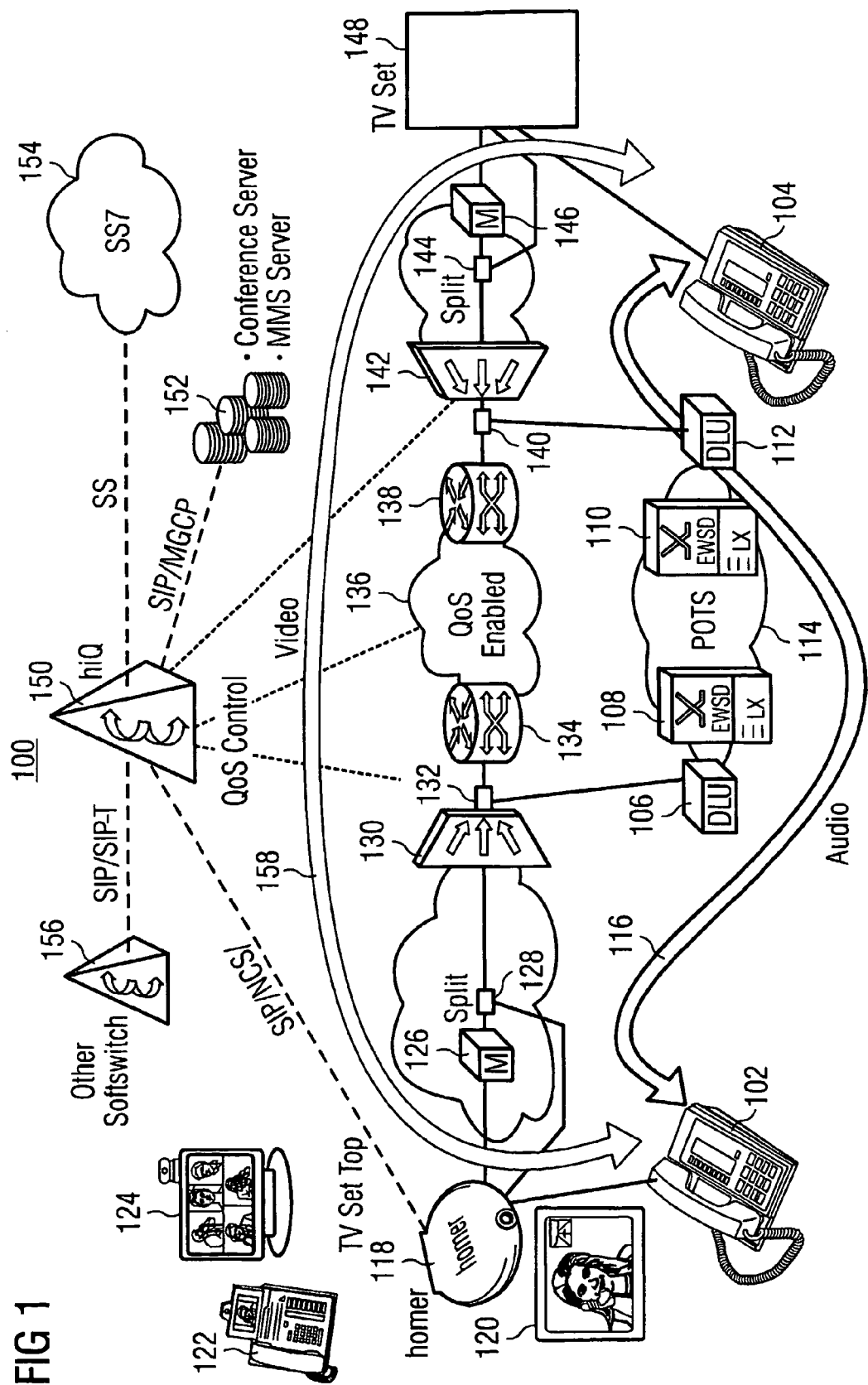
FIG. 1 is a block diagram of the system of the present invention.

In FIG. 1, there is shown the exemplary system 100, wherein a user 102 initiates a telephone call to another user 104 who is connected to a traditional telephonic network, such as POTS. Of course, the user 104 may be connected to other networks as well.

The caller 102 initiates an audio call via the standard telephone hand set shown. Normally, the audio call is switched via the POTS switching network through a Digital Line Unit (DLU) 106 coupled to an Electronic Worldwide Switch Digital (EWSD) 108 on the caller side and another EWSD 110 and another DLU 112 on the receiver side of the POTS network as indicated by the arrow 116.

In the invention, there is provided a video source, such as a set top box 118, which may be coupled to a T.V. 120, for the purpose of capturing the video image of the user 102 at the caller side. There may be provided another video capture device, such as a video phone 122 or a video enabled Personal Computer (PC) 124.

In order to couple the video source and the standard telephone equipment to the audio and A/V network, the invention provides a multiplexor 126. The telephone output is shown in the figure to be configured through the set top box and then fed into the splitter 128. The video information, or data, is generated by the video source and shown in the figure to be sent to the multiplexor 126. As will be explained later, the multiplexor 126 builds, such as packetizing, the data stream for optimal transmission over IP network.

As shown in the figure, the set top box 118 of the invention controls the splitter 128. In the exemplary invention, the set top box switches the splitter according to either the audio or A/V modes.

The audio or A/V data is then forwarded to a gateway 130, a network point that acts as an entrance to another network. A splitter 132, at the control of the gateway 130, redirects the data stream to either the POTS network 114 or the router 134 of the IP network 136. The router 134 determines the next network point to which a packet should be forwarded toward its destination. The router 134 decides which way to send each information packet based on its current understanding of the state of the networks it is connected to.

On the other side of the network 136, another router 138 for routing the packets to the appropriate sub-network of the receiving side. A splitter 140 forwards either the packets from the router 138 or, alternatively, the audio data from the POTS network 114. Gateway 142 receives either the audio or A/V information from the splitter 140 and forwards the same to the receiving side sub-network where another splitter 144 redirects the audio data to standard telephone equipment 104 or the A/V packets to a demultiplexor 146 that depacketizes the packets. The video information is reassembled and displayed by a video display device, such as the T.V. 148 shown.

Switching control of the IP network may be controlled by a switch, such as the soft switch 150 shown that has control connections the gateways 130 and 142, and the IP network 136. In addition, the switch is connected as shown in the exemplary figure to the video source 118 which exchanges information, in a protocol such as SIP/NCS/H.323, to indicate to the switch 150 when A/V information is to be transmitted. The switch 150 may also be connected to data servers through a suitable protocol, such as SIP or MGCP. These data servers may 152 include conferencing information and applications or MMS applications, for example. The switch 150 may be coupled to other networks 154, for example, such as the SS7 network shown. Further, the switch 150 may be connected to other switches 156 through an, for example, an SIP/SIP-T protocol.

Of course, the video capable network may be other than an IP network. It may be, for example, any type of packetized network, such as Ethernet.

In operation, the user 102 initiates an audio call 116. The standard telephone equipment generates the audio signals, which are channeled through the set top box 118 and then relayed to the splitter. The gateway 130 takes the audio signals and, by control of the splitter 132, redirects the audio signal to the network 114, such as a POTS, where it is handled by the DLUs and EWSD devices. The network 114 may be the traditional POTS network, for example. On the receiving side, the splitter 140 and gateway 142 receive the audio signal and forward the same to the splitter 144 where it is redirected to the telephone equipment of the receiving user 104.

When the user 102, for example, comes up with the idea to initiate a video conference, he needs only to activate the video capability from his standard telephone equipment. In response, the video source 118 activates the video capability. In the exemplary embodiment shown, the video captured of the user 102 is fed back to a display 120 at the user 102 side and optionally displayed. In any event, the video source directs the video to the multiplexor 126 which packetizes the video signal and the splitter 128 merges the video and audio signals together into a combined real time IP stream. The IP stream is transmitted via the gateway 130, the splitter 132 and the router 134 through the IP network 136 as indicated generally by the reference numeral 158. On the receiving side, the A/V signal is directed by the router 138, the splitter 140, and the gateway 142 and decoded by the splitter 144 and multiplexor 146. Whereupon the audio is parsed and sent to the telephone of the user 104 and the video is directed to the video display 148 for visual display. In the exemplary embodiment, the audio remains transmitted over the standard telephone equipment.

As indicated, the video source 118 may be a set top box (STB), which in the context of this application is defined as an electronic device that is connected to a communication channel, such as a phone, Integrated Services Digital Network (ISDN) or cable television line, and produces output on a conventional television screen. In addition the set top box includes the capability to receive and decode digital television broadcasts and to interface with the Internet through the user's television instead of a PC. Set-top boxes, as herein discussed, shall apply not only to the simplest device that receives and unscrambles incoming television signals but also to the more complex that will also function as multimedia desktop computers that can run a variety of advanced services such as video conferencing, home networking, Internet Protocol (IP) telephony, Video on-Demand (VoD) and high-speed Internet TV services.

The invention is also directed to determining an optimal arrangement for transmitting a combine A/V signal through a packetized network. As already mentioned, dividing the bandwidth between audio and video information over an IP channel is difficult. Audio has to share the bandwidth with video information, and it becomes difficult to determine the optimum amount of bandwidth to allocate. On an IP line, a packetized network such as the IP, a significant portion of the bandwidth is dedicated to headers and information describing the identity of the packet and its source and destination.

In addition, it shall be appreciated that the network carriers are constrained, either intentionally to save costs or physically, to narrower bandwidths than that capable. Perhaps, some networks are older than others, such as can occur if the network exists in another country. Further, the up stream and down stream bandwidths are not always symmetrical, meaning that an up link may have a smaller bandwidth than down stream. And, hence the invention takes these factors into account in formulating the optimum IP stream format.

Figure 2:
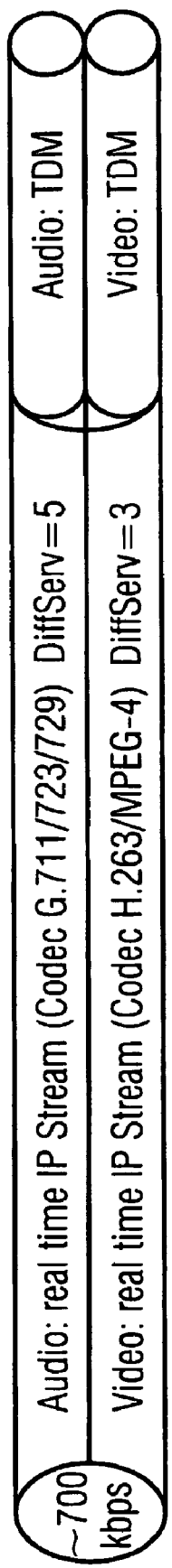
FIG. 2 is a pictorial representation of the band divided into audio and video information of the present invention.

As shown in FIG. 2, the bandwidth available shown is approximately 700 Kbps, although the theoretical Kbps is actually much higher. Thus, the audio and video signals are separated into Time Division Multiplex (TDM) channels. The audio is coded according to the G.711/723/729 protocols and the video according to the H.263/MPEG-4 protocol. Ideally, the invention could provide an upstream DSL line may provide 768 Kbps for the video signal and the downstream signal may offer 1500 Kbps. For a bi-directional line, the invention provides 384 Kbps, for example.

Figure 3:
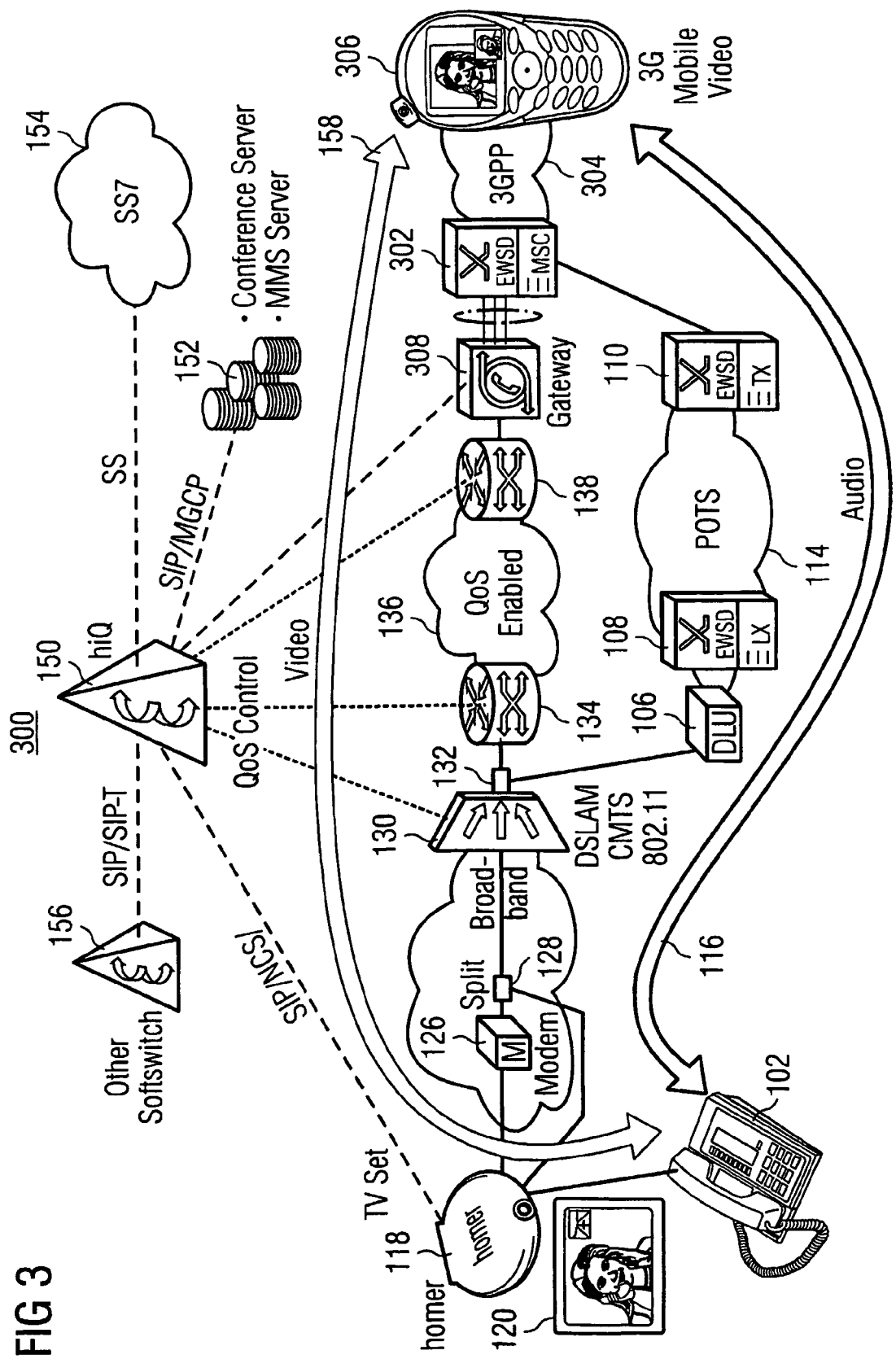
FIG. 3 is a block diagram illustrating an alternate connection for the audio and combined audio and video.

FIG. 3 illustrates a variation 300 on the system shown in FIG. 1. Similar features are shown with the same reference numerals. In this example, the audio call 116 is channeled through the POTS network 114 to the gateway 302, which is coupled to a PSTN 3GPP network 304. The network 304 may support mobile phone services, for example. A gateway 308 is further provided that is capable of coupling to the 3GPP network 304 such that the A/V stream 158 is coupled to the 3GPP network 304.

Figure 4:
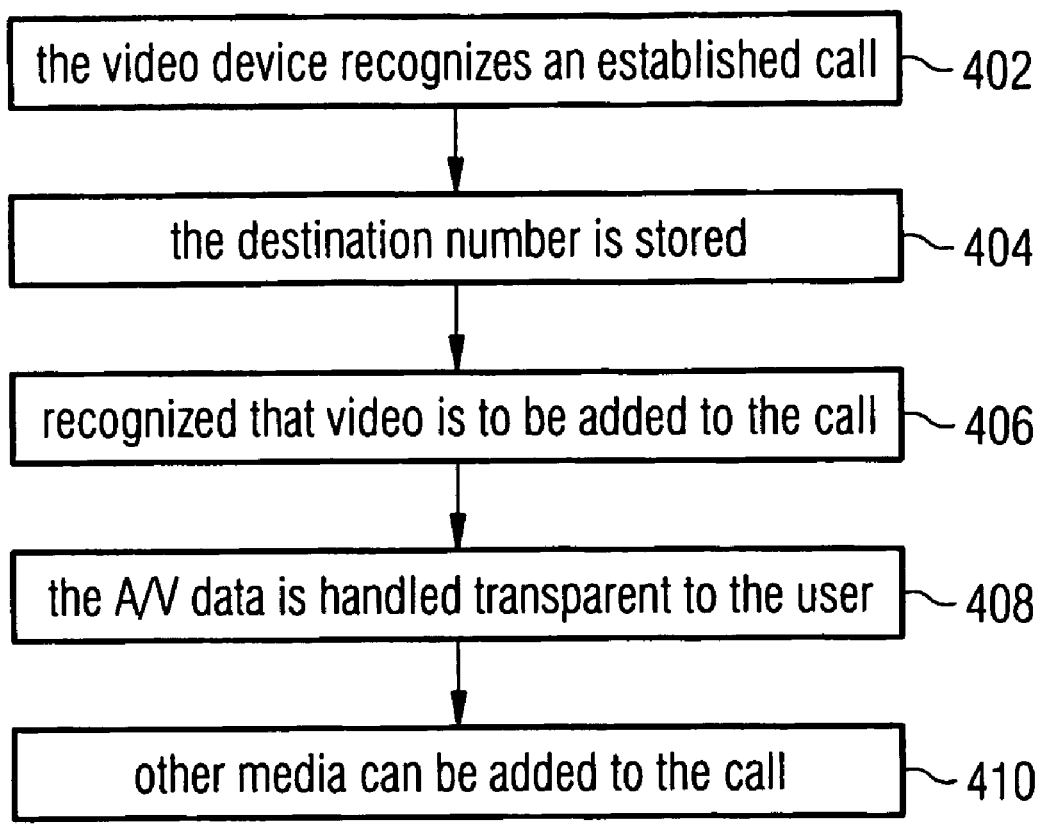
FIG. 4 is a flow diagram of the process flow of the present invention.

Now, the method of the present invention shall now be discussed in reference to FIGS. 4 and 5. While the invention is discussed in terms of process steps, it is intended that the foregoing method be implemented as a protocol for performing a call jump to a carrier network capable of carrying video signals, such as the IP network heretofore mentioned.

In general, the invention comprises the steps shown in FIG. 4A. In step 402, the video device recognizes an established call, such as from the traditional PSTN network. In step 404, the destination number is stored. It is then recognized in step 406 that video is to be added to the call. At this time, the existing call is transferred seamlessly to the data network. In the exemplary embodiment, the audio remains transmitted over the standard telephone equipment. In step 408, the A/V data is handled transparent to the user. In step 410, which represents a variant on the main theme, other media can be added to the call. This may include software related data, such as gaming data for applying on-line games to the A/V signal Now with respect to FIG. 5, there is shown the process for establishing the call jump. In step 500, a party A, such as the user 102 (FIG. 1) calls party B using a normal or traditional telephone system, such as PSTN, and a normal telephone connection is established according to the known standard telephone call connection procedures. The video source (118, FIG. 1) on the party A side recognizes and stores the destination phone number in step 502.

At this time, the telephone call acts like a normal call. The parties A & B communicate via the standard telephone network using the standard telephone equipment. If it occurs that the parties terminate the call, such as in step 504, the video source 120 takes no action and the destination number is ignored. In the FIG. 1 it is shown that the standard telephone equipment is coupled through the video source 120. As mentioned earlier, the video source 120 forwards the audio signal in this case to the splitter 128.

In the case that either party comes up with the idea suddenly to add video to their call, such as a video conference or video gaming, the invention triggers the call jump procedure in step 506. In one aspect of the invention this is triggered by activation of the user, such as by button or voice activation. The button may be, for example, a button already existing with the standard telephone equipment or standard numeric keypad, such as the # key. The # key is suitable because it is not normally used during a phone call. Other keys that are not normally used during the call are similarly suitable. In step 508, the corresponding video source recognizes the trigger and initiates the steps necessary for performing the all jump.

In step 510, the video source, for example referenced element 120 (FIG. 1), sends an activating signal to the other end, where another video source may be located. This may be done through the already established POTS telephone call, for example. In step 512, both video enabled devices prepare for the call jump by establishing a connection to the network 136, which is a packetized network in the exemplary embodiment. Advantageously, this saves resources on the data network side as the video sources do not have to be online all the time. Thus, it is sufficient to connect on-demand. This is clearly an advantage over to the video communication solutions discussed above, which are reachable only if they are online.

In step 514, the video enabled devices each register themselves with the network 136 at a call handling server. For an IP network, the video enabled devices send a REGISTER message to an H.323 gatekeeper, a SIP proxy or another call handling server. In step 516, the video enabled devices establish the data call using the known IP network rules for establishing a call, for example. This may be done from either side, but it is exemplary to establish the call from the party A side, so that the original caller may be charged for additional services or added call features.

As soon as the data connection between the video enabled devices is established, the video enabled devices transfer the audio to VoIP. As shown, the original audio signals are rerouted to the multiplexor in step 518, which packetizes the audio along with the video in step 520, for transmission through the IP network in step 522 via the gateways and routers 130, 134, 138, 142. In one aspect of the invention, the original audio call 116 is terminated in step 524, which is not necessary, but may save resources and telephone charges.

Thus, the invention provides a seamless jump from a traditional telephone network to a video capable network, such as a packetized network. Ideally, the users are unaware of the jump, other than perhaps a low 'click' caused by the switching. Thus, the users communicate using their known devices, particularly the PSTN telephone, and offer additionally a convenient manner to add video capability. There is provided a device that provides the convenience equipment that the user is accustomed to a such as those found in the common living room. This is done without inconveniencing the user with a special video conferencing phone. The invention seamlessly transitions a call to implement the exchange of video information. There is provided a protocol of the present invention for enabling easy-to-use standard communication equipment which connect through the traditional telephone network that establishes the video communication over video enabled carrier, such as an IP connection.

While the present invention has been described with respect to the foregoing detailed description, it shall be understood that other embodiments and modifications to the invention are still within the scope of the invention.

The invention claimed is:

1. A method for performing a call jump from a call established using a Public Switched Telephone Network (PSTN) to a video carrying call, comprising:
    establishing a PSTN call with audio signals between a first and second party;
    storing a destination number by a video enabled device;
    activating the call jump by operation of a device by the first party;
    sending a request to complete the call jump in response to the activating;
    accepting the call jump by the second party;
    generating a signal in response to the acceptance that indicates that the call jump should be completed;
    initiating the call jump thereby connecting the parties via a packetized network;
    transmitting multiplexed audio and video signals over the packetized network; and
    terminating the PSTN call from the Public Switched Telephone Network to proceed with the video carrying call.

2. The method according to claim 1, wherein the device is a telephone or an apparatus coupled to a telephone.

3. The method according to claim 2, further comprising packetizing the audio and video signals.

4. The method according to claim 3, further comprising registering the video enabled device with the packetized network.

5. The method according to claim 3, wherein the activating is achieved via a Dual Tone Multi Frequency key on the telephone.

6. The method according to claim 3, further comprising charging the first party for activating the call jump.

7. The method according to claim 3, further comprising recognizing the established call by the video enabled device.

8. The method according to claim 3, further comprising determining a division between audio and video bandwidth by multiplexing the video signals with the audio signals.

9. The method according to claim 8, further comprising recognizing that video is to be added to the call.

10. The method according to claim 8, further comprising establishing a connection via the video enabled device.

11. A call jump system for jumping a call established over a Public Switched Telephone Network (PSTN) to a packetized network, comprising:
    a telephone;
    a PSTN call including a first call side and a second call side;
    a video enabled device configured to store a destination number;
    an input by a user of the first call side that activates the call jump at a first party;
    a requestor that requests a second party side to complete the call jump;
    an acceptor that accepts the call jump by the second party side;
    the video enabled device being configured to reroute the audio selectively to a network system selected from a group consisting of a traditional telephone carrier and the packetized network;
    a multiplexor that multiplexes the audio and video;
    a packetizer that packetizes the multiplexed audio and video signals from the standard telephone equipment, wherein the video is sent over the packetized network when the call jump is requested by the first party and accepted by the second party; and
    the system being configured to terminate the PSTN call from the Public Switched Telephone Network to proceed with the call over the packetized network.

12. The system according to claim 11, further comprising a gateway for coupling the packetized audio and video signals to the network system.

13. The system according to claim 12, wherein the video enabled device is selected from the group consisting of a set top box, a video phone, and a video enabled PC.

14. The system according to claim 12, further comprising a router for routing the audio and video packetized signals through the packetized network to the receiving side.

15. The system according to claim 14, wherein the packetized network is an IP network.

16. The method according to claim 11, wherein the input is via a Dual Tone Multi Frequency key on the telephone.

17. The method according to claim 11, further comprising charging the first party for activating the call jump.

* * * * *